LIGHT COMMUNICATION SYSTEM WITH IMPROVED SIGNAL-TO-NOISE RATIO

Filed Aug. 28, 1967

INVENTOR
R. KOMPFNER
BY
Kenneth W. Mattie
ATTORNEY 3,532,889

LIGHT COMMUNICATION SYSTEM WITH IMPROVED SIGNAL-TO-NOISE RATIO

Rudolf Kompfner, Middletown, N.J., assignor to Bell Telephone Laboratories, Incorporated, Murray Hill, N.J.

Filed Aug. 28, 1967, Ser. No. 663,692
Int. Cl. H04b *9/00*
U.S. Cl. 250—199 3 Claims

ABSTRACT OF THE DISCLOSURE

An optical frequency carrier transmission system in which heterodyne detection is used. A pilot signal is transmitted along with the amplitude-modulated signal, and both signals arrive at the receiving station with similar phasefront and amplitude distortion. Amplification of the pilot signal prior to detection permits heterodyne operation with a significantly improved signal-to-noise ratio.

BACKGROUND OF THE INVENTION

Field of the invention

This invention relates to communication systems using a modulated optical carrier and, more particularly, to such systems in which the signal-to-noise ratio is improved by frequency selective amplification at the receiver prior to detection.

Description of the prior art

One major problem encountered in communications over large distances, either from point to point on earth or from a point on earth to a celestial station, is phase and amplitude distortion of the energy wavefront due to perturbations by either the atmosphere itself or by system components. In order to employ heterodyne detection at the receiver, it is necessary that the local oscillator signal have the same phase and amplitude characteristic as the incoming signal to be detected. When the incoming signal is widely distorted, it becomes extremely difficult to provide a local oscillator having the proper characteristic.

SUMMARY OF THE INVENTION

In accordance with the present invention, an optical pilot signal of a frequency equal to the local oscillator frequency desired at the receiver station is transmitted along with the signal-modulated optical carrier. Passing through the transmission medium together, both carrier and pilot experience similar perturbations and both signals, therefore, arrive at the receiving station with substantially similar phase and amplitude distortions. Likewise, any distortions introduced by the system components themselves affect both signals equally. At the receiver, the jointly-collected carrier and pilot energy pass through amplification means having a gain curve which peaks at the pilot frequency and is substantially unity gain, or transparent, at the carrier frequency. Thus amplified, the pilot—now the local oscillator—and the modulated carrier pass to detection means associated with an optical heterodyne receiver. By virtue of the similarity in phase and amplitude distortion of the modulated carrier and local oscillator, heterodyne detection can be successfully employed. Since the amplitude of the local oscillator is large compared with the amplitude of the modulated carrier, a highly acceptable signal-to-noise ratio is afforded.

BRIEF DESCRIPTION OF THE DRAWING

The many advantages and attributes of the invention, together with the various objects thereof and its mode of operation, can be more readily understood from reference to the accompanying drawing and to the detailed description thereof, in which.

DETAILED DESCRIPTION

Figure 1:
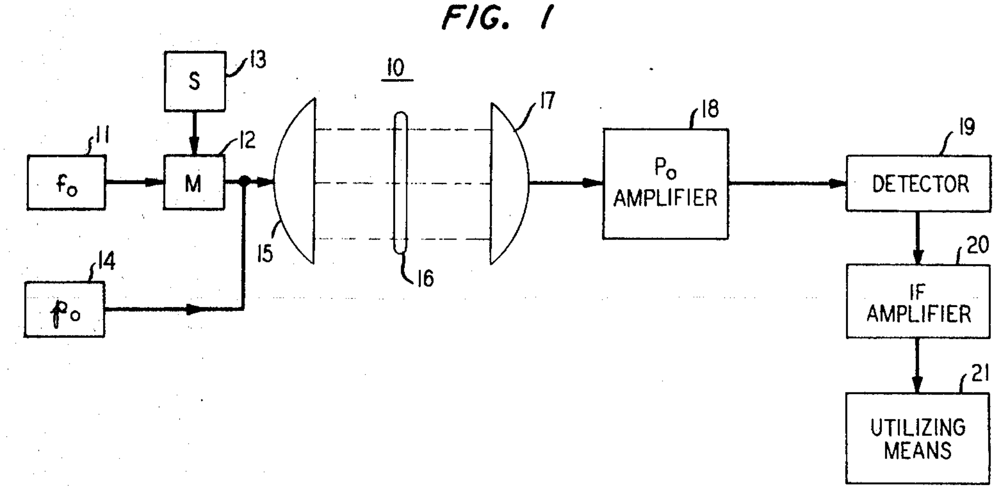
FIG. 1 is a block diagram of an optical system in accordance with the invention.

Referring now in detail to FIG. 1, there is shown an optical transmission system 10 in accordance with the principles of the invention in which a source 11 of frequency $f_0$ supplies an optical carrier signal to modulation means 12. Simultaneously, source 13 supplies to modulator 12 an information bearing signal S to be transmitted on the carrier. The modulated signal will be termed $s_0$. At optical frequencies, source 11 can be a laser with modulator 12 situated either outside or inside the laser cavity. One typical internal modulation arrangement is disclosed, for example, in the copending, commonly-assigned application of I. P. Kaminow, Ser. No. 379,273, filed June 30, 1964, now Pat. No. 3,405,370. A second optical source 14, of constant frequency $p_0$ different from $f_0$ by the intermediate frequency desired at the receiving terminal, supplies a pilot signal which is superposed with the output of modulator 12 at transmitting means 15. Transmitting means 15 can comprise, for example, an optical lens system emitting a collimated beam of parallel light rays into the atmosphere 16. Alternatively, the transmission from transmitting means 15 to receiving means 17 can be over an enclosed medium such as a series of redirectors such as lenses disposed within a continuous light pipe. In FIG. 1, the propagation of modulated carrier $s_0$ and pilot $p_0$ is indicated by dashed lines 16 extending between transmitting means 15 and receiving means 17.

For purposes of discussion, we will designate the modulated carrier at receiving means 17 as $S_0$ and the pilot signal at the receiving means 17 as $P_0$. Under ideal circumstances a receiver of optical radiation which receives a signal with a mean power $S_0$ will have a signal-to-noise ratio at the detector equal to $S_0$ times the quantum efficiency of the detector, divided by photon shot-noise power at the detector input. When the detector is a photomultiplier this $S/N$ ratio can be closely approached even when circumstances are not ideal; as, for example, when inhomogeneities in the atmosphere tilt and scramble the signal wavefronts. As long as all the radiation intercepted by the receiving antenna reaches the detector, it does not matter that the distribution of phase and amplitude is chaotic over the detector, and electrons will be emitted everywhere in proportion to the local intensity of radiation so that the total signal current will be proportional to the integral of the intensity over the detector surface.

If the atmosphere were homogeneous, or well behaved, it should in principle be possible to concentrate the received signal radiation into an area $A_0$ dependent only on the tangent of the angle subtended at the detector by the effective antenna aperture radius.

A real atmosphere will perturb the radiation so that, on the average, it will occupy an area A which always will be larger than $A_0$. We may express this fact by saying that the signal is now carried by $n$ modes, where $n$ is the ratio between A and $A_0$. As long as the photocathode of the photomultiplier is larger than A, the signal-to-noise ratio remains as described.

When a plurality of modes is propagating, there is a noise contribution from each. At the receiver, any preamplification of the signal bearing carrier will produce excessive total noise and a degraded signal-to-noise ratio. Furthermore, any heterodyne detection system with a local oscillator signal generated at the receiver would be rendered inoperative by the scrambled phasefront of the received signal and the unscrambled phase of the local oscillator. This latter shortcoming is overcome in accordance with the principles of the present invention by transmitting signal and pilot together over the same transmission path. The result is that both signal and pilot are identically scrambled and arrive at the receiver with matching phasefronts.

Figure 2:
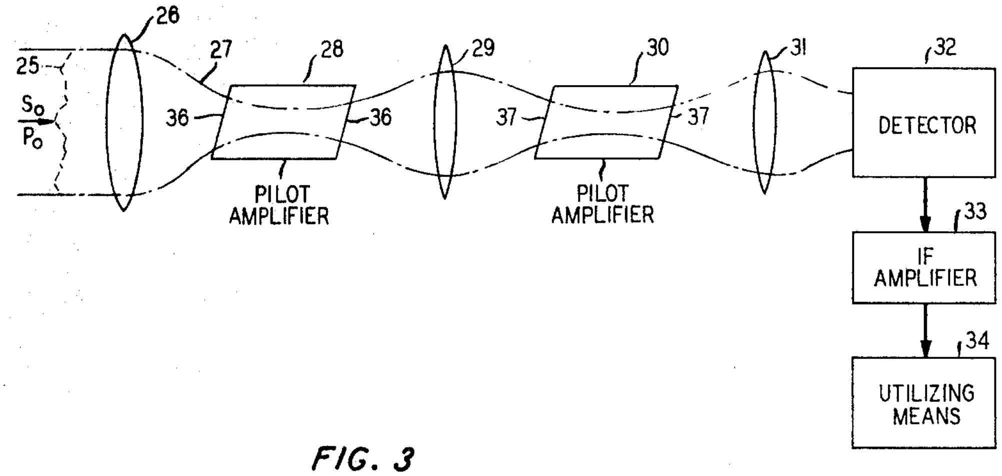
FIG. 2 is a schematic representation of one portion of the system.

In further accord with the present inventive principles, the received pilot signal $P_0$ is amplified by amplifier 18 in FIG. 1 before both signal and ampified pilot pass to detector 19 and on to standard intermediate frequency ampifier 20, and thence to utilizing means 21. The pilot amplifier, to be more specifically set out and described with reference to FIG. 2, is transparent to the signal carrier frequency. Thus, the received power $S_0$ passes to detector 19 unamplified while the amplitude of $P_0$ is substantially increased. At the receiver, the pilot signal, as amplified, becomes the local oscillator. The system here described can thus be called a locally-amplified pilot heterodyne detection arrangement.

As shown by Kogelnik and Yariv in 52 Proceedings of I.E.E.E. 165 (1964), each of $n$ modes of an optical amplifier contributes noise in the amplification process. Since the incoming pilot is made up of a plurality of modes, the locally-amplified pilot, or local oscillator signal, will be constructed of power $P_0$ times gain plus noise mode power times gain. Thus, the locally-amplified pilot is a noisy local oscillator, and will, therefore, modulate the signal $S_0$ with a noise contribution. However, only one of the $n$ noise modes of the locally-amplified pilot will beat effectively with the signal because the noise modes are not correlated with the signal modes.

Figure 3:
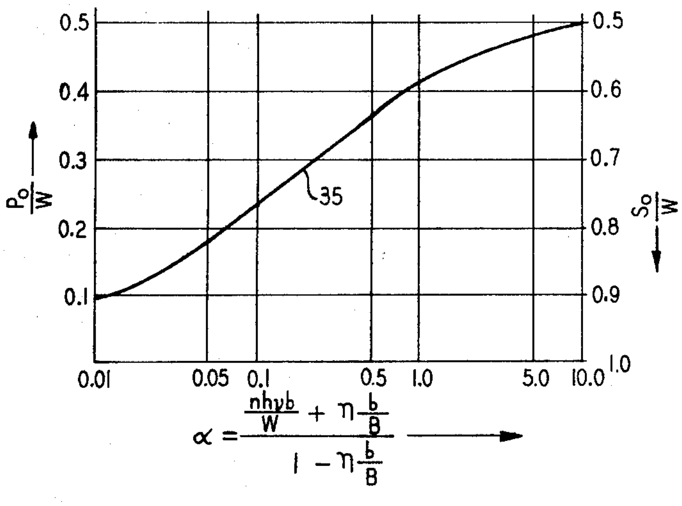
FIG. 3 is a graph useful in understanding the operation of FIG. 2.

In order to derive the optimum signal-to-noise ratio, we assume that the total input power $S_0+P_0=W$ is held constant. It can be shown that the fraction of pilot power arriving at the receiver which gives the best $S/N$ ratio is $$P_0=W\alpha\left(\sqrt{1+\frac{1}{2}}-1\right) \qquad (1)$$

while the signal power is $$S_0=W\left[1-\alpha\left(\sqrt{1+\frac{1}{2}}-1\right)\right] \qquad (2)$$

where $\alpha$ is a constant dependent on the bandwidth of the amplifier $b$, signal bandwidth B, quantum efficiency of the detector ($\eta$), number of propagating modes $n$, and photon shot-noise power at the detector. Equations 1 and 2 are plotted in FIG. 3 as curve 35 from which one notes that the optimum division of the transmitter power for large values of $\alpha$ is fifty-fifty, while it approaches $(\sqrt{\alpha}-\alpha)$ for $a<<1$.

By introducing R, the hypothetical signal-to-noise ratio of the quantum counter, and simplifying, we find $$S/N_{\text{opt}}\approx R\left[1-2\alpha\left(\sqrt{1+\frac{1}{\alpha}}-1\right)\right] \qquad (3)$$

The factor bracketed in Equation 3 indicates how much the signal-to-noise ratio is degraded on account of the phase front perturbation.

Table I gives values of this degration factor for a wide range of values of $$\eta\frac{b}{B}$$

and $n/R$.

TABLE I

| N/R | $\eta b/B$ 0.1 | 0.01 | 0.001 |
|---|---|---|---|
| 0.1 | 0.492 | 0.812 | 0.936 |
| 1.0 | 0.420 | 0.754 | 0.914 |
| 10.0 | 0.164 | 0.492 | 0.812 |
| 100.0 | 0.09 | 0.243 | 0.757 |

As a practical example, suppose $n=1000$ modes, $R=100$, $\eta=0.3$, $B=300$ megacycles, $b=10$ megacycles. Then $n/R=10$, $$\eta\frac{b}{B}=0.01$$

and we find that the actual signal-to-noise ratio is $100\times0.493=49.2$ or about 17 db. If $n$ had been unity, we could have put all the transmitter power into the signal, used a real local oscillator and would have gotten a signal-to-noise ratio of 20 db. Hence, under the above conditions, the price paid for having the signal arriving in 1000 possible modes is a mere 3 db.

One possible arrangement for the initial portion of the receiver is illustrated in FIG. 2 in which incoming signal power $S_0$ and pilot power $P_0$ are incident with a perturbed phasefront indicated by dashed line 25 upon a receiving antenna or telescopic lens 26. The effect of lens 26 is to focus the incident power along contour 27 toward a narrow waist portion at which amplification means 28 is situated. Oftentimes it is desirable in optical amplification means to prevent saturation of the amplifying medium by introducing lower gains in each of a plurality of sections. Thus, in FIG. 2, a second pilot amplification stage 30 is positioned beyond focusing means 29, and an output focuser 31 causes the amplified pilot and incident signal to converge toward detector 32. If desired, more or less than two amplification stages can be used. Upon detection, the output IF signal passes to amplifier 33 and thence to ultiziation means 34.

The pilot amplifier itself can take several forms. The essential criteria include narrow amplification bandwidth, high gain to the pilot frequency, and transparency to the signal. Tuneability to the pilot frequency is advantageous. The dependence of gain on distance from the amplifier axis should be minimized because such dependence will introduce an amplitude distortion into the amplified pilot wave and will consequently degrade the heterodyne detection process. Fluctuations of gain with time should also be minimized.

A typical pilot amplification means is, therefore, an optical maser, or laser, amplifier having a gain curve peaked at the pilot frequency. Thus, in FIG. 2, amplifiers 28 and 30 are shown with Brewster angle and portions 36, 37, respectively. The particular laser medium can be solid, liquid, or gas, depending on the frequency range of interest and on the availability of suitable laser media in that frequency range.

When the pilot amplifier is to operate in a frequency region for which not much gain per unit length is obtainable, it is advantageous to use a regenerative-type amplifier which provides gain at the cost of bandwidth, a feature which is particularly welcome in the present arrangement. It should be noted that the amplifier should be capable of amplifying all the transverse modes of the pilot with approximate uniformity.

In all cases it is understood that the above-described arrangements are only illustrative of the principles of the invention. Numerous and varied other arrangements could be devised by those skilled in the art without departing from the spirit and scope of the invention.

What is claimed is:

1. An optical frequency transmission system comprising:

means for simultaneously transmitting an amplitude-modulated optical frequency carrier of frequency $f_0$, and an unmodulated optical frequency pilot signal of frequency $\rho_0$ different from said carrier;

and a receiver including:

an amplifier for amplifying said pilot signal;

and a heterodyne detector for mixing said carrier and said amplified pilot signal to produce a difference frequency output signal.

2. In a transmission system adapted to simultaneously propagate a signal modulated optical carrier and an unmodulated optical pilot signal of frequency different from said carrier frequency, a receiver comprising:

means for amplifying said received pilot signal;

and heterodyne detection means for mixing said amplified received pilot signal and said received carrier to produce a difference frequency output signal.

3. An optical frequency transmission system according to claim 1 wherein said amplitude-modulated optical frequency carrier and said pilot signal are transmitted through said amplifier, and wherein said amplifier is substantially transparent to said carrier.

References Cited

UNITED STATES PATENTS

| | | | |
|---|---|---|---|
| 3,068,416 | 12/1962 | Meyer | 325—329 XR |
| 3,229,106 | 1/1966 | Lord et al. | 250—199 XR |
| 3,284,632 | 11/1966 | Niblack et al. | 250—199 |
| 3,435,229 | 3/1969 | Buhrer | 250—199 |

RICHARD MURRAY, Primary Examiner

R. S. BELL, Assistant Examiner

U.S. Cl. X.R.

332—7.51